(12) United States Patent  (10) Patent No.: US 9,103,383 B2
Hundrieser  (45) Date of Patent: Aug. 11, 2015

(54) CLUTCH LINK FOR A DRIVING CLUTCH

(71) Applicant: GKN Sinter Metals Holding GmbH, Radevormwald (DE)

(72) Inventor: Stefan Hundrieser, Bonn (DE)

(73) Assignee: GKN Sinter Metals Holding GmbH, Radevormwald (DE)

( * ) Notice: Subject to any disclaimer, the term of this patent is extended or adjusted under 35 U.S.C. 154(b) by 145 days.

(21) Appl. No.: 13/971,289

(22) Filed: Aug. 20, 2013

(65) Prior Publication Data

US 2013/0334007 A1 Dec. 19, 2013

Related U.S. Application Data

(63) Continuation of application No. 12/704,260, filed on Feb. 11, 2010, now abandoned, which is a continuation of application No. PCT/EP2008/006645, filed on Aug. 13, 2008.

(30) Foreign Application Priority Data

Aug. 13, 2007 (DE) .......................... 10 2007 038 254

(51) Int. Cl.
| | |
|---|---|
| *F16D 11/00* | (2006.01) |
| *F16D 3/66* | (2006.01) |
| *F16D 3/04* | (2006.01) |

(52) U.S. Cl.
CPC .................. *F16D 11/00* (2013.01); *F16D 3/04* (2013.01); *F16D 3/66* (2013.01); *F16D 2250/00* (2013.01)

(58) Field of Classification Search
CPC ............. F16D 11/00; F16D 3/04; F16D 3/64; F16D 3/66; F16D 3/68
USPC .............................. 464/102, 103, 104, 93, 105
See application file for complete search history.

(56) References Cited

U.S. PATENT DOCUMENTS

| 1,027,520 A | * | 5/1912 | Blood .............................. 279/16 |
| 1,460,869 A | | 7/1923 | Thropp |

(Continued)

FOREIGN PATENT DOCUMENTS

| DE | 1859853 U | 10/1962 |
| DE | 2455874 A1 | 5/1975 |

(Continued)

OTHER PUBLICATIONS

PCT International Search Report, PCT/EP2008/006645, Dec. 9, 2008, 2 pages.
PCT English Translation of the International Preliminary Report on Patentability, PCT/EP2008/006645, Mar. 11, 2010, 6 pages.

*Primary Examiner* — Robert Hodge
*Assistant Examiner* — Ryan Dodd
(74) *Attorney, Agent, or Firm* — Quarles & Brady LLP

(57) ABSTRACT

A first clutch link for a driving clutch is capable of engaging another clutch link through interaction of a receptacle chamber and a projection. The first clutch link includes a contact surface and a counter surface, which are located on parallel planes. A hole is implemented behind the counter surface and is connected via a gap to the receptacle chamber. This hole extends parallel to the longitudinal axis of the driving clutch. A spring element is situated in the hole and has a contact area for contact on the other clutch link, which protrudes through the gap into the receptacle chamber. The hole has at least one opening, whose edge projects at least partially radially inward with respect to the hole in order to prevent the spring element from slipping through the opening of the hole.

17 Claims, 10 Drawing Sheets

(56) References Cited

U.S. PATENT DOCUMENTS

| | | |
|---|---|---|
| 2,109,935 A | 3/1938 | Thomas |
| 2,138,253 A | 11/1938 | Lynch |
| 3,438,221 A | 4/1969 | Paulsen |
| 6,179,716 B1 * | 1/2001 | Asa .................................. 464/93 |
| 6,875,114 B2 | 4/2005 | Barron et al. |

FOREIGN PATENT DOCUMENTS

| | | |
|---|---|---|
| DE | 20100016 U1 | 3/2001 |
| FR | 554876 A | 6/1923 |
| FR | 67210 E | 11/1957 |
| JP | H0642473 A | 2/1994 |

* cited by examiner

CLUTCH LINK FOR A DRIVING CLUTCH

CROSS REFERENCE TO RELATED APPLICATIONS

This application is a continuation application of U.S. patent application Ser. No. 12/704,260 filed on Feb. 11, 2010 which is a continuation application of International Patent Application No. PCT/EP2008/006645 filed Aug. 13, 2008, which claims the priority of German Patent Application No. 10 2007 038 254.7 filed Aug. 13, 2007, the disclosures of which are hereby incorporated by reference in their entirety for all purposes.

STATEMENT CONCERNING FEDERALLY SPONSORED RESEARCH OR DEVELOPMENT

Not applicable.

FIELD OF INVENTION

The present invention relates to a clutch link for a driving clutch and a method for producing a sintered component having connection apparatus, in particular a clutch link for a driving clutch.

BACKGROUND

Clutch links of this type for a driving clutch, which is also referred to as a claw clutch, are known in the prior art, which have a receptacle chamber for receiving another clutch link of the driving clutch, the receptacle chamber comprising a contact surface and a counter surface, which points toward the contact surface. In these known clutch links, the connection to the particular other clutch link is produced in that the other clutch link is entirely or partially placed in the receptacle chamber, for example, using a projection. The manufacturing tolerances of the other clutch link and/or projection and the receptacle chamber are selected as needed so they match with the particular desired type of fitting, i.e., play fitting, transition fitting, or excess fitting. Small tolerances may typically be achieved by machining reworking, which is connected with significant additional effort above all in the event of hard and/or brittle materials, such as ceramics, glasses, sintered metals, etc.

SUMMARY OF THE INVENTION

It is the object of the present invention to provide a clutch link for a driving clutch, which can be produced cost-effectively, and a method for producing a sintered component having connection apparatus, in particular a clutch link for a driving clutch, which is simple to execute.

This object is achieved by the present invention and further embodiments are described in the subclaims.

The invention provides a clutch link for a driving clutch, which has a receptacle chamber for receiving another clutch link of the driving clutch. The receptacle chamber comprises a contact surface and a counter surface, which points toward the contact surface. A hole is implemented behind the counter surface and is connected via a gap to the receptacle chamber. The hole extends parallel to the longitudinal axis of the driving clutch. A spring element is situated in the hole and has a contact area for contact on the other clutch link, which protrudes through the gap into the receptacle chamber. The receptacle chamber of the proposed clutch link, which is also referred to as a first clutch link here, receives the other clutch link, which is to be connected to the first clutch link and is also referred to as a second clutch link here, this being understood to mean that the second clutch link is at least partially located, for example, using a projection, in the receptacle chamber.

The invention additionally provides a clutch link for a driving clutch, which has a projection for insertion into a receptacle chamber of another clutch link of the driving clutch. The projection comprises a contact surface and a counter surface, which points away from the contact surface. A hole is implemented behind the counter surface and is connected via a gap to the external chamber located in front of the counter surface, i.e., to the receptacle chamber, if the projection is inserted into the receptacle chamber. The hole extends parallel to the longitudinal axis of the driving clutch. A spring element is situated in the hole and has a contact area for contact on the other clutch link, which protrudes through the gap into the external chamber located in front of the counter surface, i.e., the receptacle chamber, if the projection is inserted into the receptacle chamber. The receptacle chamber of the other clutch link, which is also referred to as a second clutch link here, receives the proposed clutch link, which is to be connected to the second clutch length and is also referred to as a first clutch link here, this being understood to mean that the first clutch link is at least partially located, for example, using the projection, in the receptacle chamber.

In the proposed clutch links, the spring element has its contact area protruding far enough into the receptacle chamber so that it presses against the second clutch link with bias tension and presses it against the contact surface. The second clutch link is thus, at least in the context of the spring force of the spring element, connected to the first clutch link without play. Even greater tolerances of the first and second clutch links may be compensated for and nonetheless play-free fitting may be achieved. The production of clutch links having greater tolerances is simpler and more cost-effective, even if one considers the additional outlay for holes and spring elements, which are provided in the proposed first clutch link. This is because the holes may be generated very cost-effectively and precisely positioned, for example, by casting, compression, etc. during the original shaping of the first clutch link and they ensure easier demolding from a casting or compression mold because of their orientation parallel to the longitudinal axis of the driving clutch, or in that they are introduced into the first clutch link by drilling, milling, etc. The spring elements may also be produced very cost-effectively and inserted into the holes, for example, automatically.

The proposed clutch links are particularly suitable for dynamically loaded systems. Thus, for example, in oscillating systems having dynamic forces, in particular in the event of oscillating or swelling forces, high tension peaks occur in the connected clutch links, which may result in fracture, in particular, at notch-sensitive points. These dynamic forces become more and more critical the greater the play there is in the connected clutch links. Therefore, clutch links having low ultimate elongation and/or greater brittleness, such as clutch links made of sintered hard metal, ceramic, glass, and the like, are particularly endangered. The spring force can be selected via the spring elements so that no play occurs even at maximum load. In this way, the safety factor against fracture is increased and/or material thickness is saved and/or materials which are more cost-effective because they are more brittle can be used. A further advantage is in the frequent cases in which the dynamic forces cannot be ascertained beforehand, in that in these cases the geometry of the clutch links does not have to be altered. Rather, the diameter and position of the holes may be maintained and various spring elements, which have different spring constants with equal external dimensions, may simply be tested out, because they may be replaced easily.

The invention provides that each of the proposed clutch links comprises a sintering material. Because finished sintered clutch links are typically very hard, and may therefore only be reworked by machining with great effort and tool wear, it can be viewed as a further advantage in each of the proposed clutch links that because of the possible greater tolerances, machining reworking of this type is only required to a greatly reduced extent, or even not at all. In many cases, the form of the clutch link, in particular the depressions such as the receptacle chamber and the holes, can be designed without undercuts, so that the original shaping, for example, by casting, compression, etc., can be performed using little effort and simple molds, which is advantageous in particular with sintered components.

Each of the proposed clutch links can be provided, as needed, with at least one further hole and at least one further spring element in each further hole, each of the further holes being connected via a gap to the receptacle chamber, and each of the further spring elements having a contact area for contact on the other clutch link, which protrudes through the particular gap into the receptacle chamber. Thus, for example, in a first alternative a further hole can be implemented behind the counter surface. The two holes are thus adjacent to one another on the same side of the receptacle chamber. The other clutch link is pressed against the contact surface by the spring elements seated in the two holes at two adjacent areas.

In a second alternative, for example, a further hole can be implemented behind the contact surface. The two holes are thus directly opposite to one another or are offset to one another on the two sides of the receptacle chamber pointing toward one another. The other clutch link is pressed by the spring elements, which are seated in the hole behind the counter surface and are also referred to as first spring elements here, against the further spring elements, which are seated in the further hole behind the contact surface and are also referred to as second spring elements here, and/or clamped between the first and second spring elements, if the two holes and thus the first and second spring elements are directly opposite to one another, or in the other case, in which the two holes and thus the first and second spring elements are offset to one another, it is pressed by the first spring elements against the contact surface and by the second spring elements against the counter surface.

The first and second alternatives may also be combined, however, so that three holes and corresponding first, second, and third connection elements are provided, of which two holes lie behind the counter surface and one lies behind the contact surface, or vice versa. In addition, a fourth hole and at least one further fourth spring element in this fourth hole may also be provided. In this case, the location of the holes relative to the receptacle chamber and/or behind the counter surface and the contact surface and the configuration of the holes relative to one another may also be selected arbitrarily as needed. Thus, for example, two holes may be implemented behind the counter surface and the two other holes may be implemented behind the contact surface and two holes may be directly opposite to one another in each case.

The spring element can preferably comprise a hollow cylinder, which has a slot running between the two front faces. The slot preferably runs parallel to the longitudinal axis of the hollow cylinder, but can also run diagonally. The hollow cylinder is preferably produced from strip material made of spring steel, but can also comprise any other material suitable for the particular application, such as plastic.

The spring element can also be shaped differently as needed, however, and comprise a ring which has a slot, for example. The ring is preferably produced from wire material made of spring steel, but can also comprise any other material suitable for the particular application, such as plastic.

Furthermore, a protrusion can project from the peripheral surface of the hole and lie in the slot of the hollow-cylindrical or annular spring element. The protrusion is preferably a rib running parallel to the longitudinal axis of the hole, because it can be demolded more easily from a casting or compression mold. The protrusion prevents twisting of the spring element in the hole.

Furthermore, the spring element can be implemented as solid, for example, in the form of a pin or bolt, and can comprise an elastic material such as plastic or rubber.

The shape of the spring element can be selected arbitrarily as needed. Thus, for example, it can have a peripheral surface having an oval, preferably elliptical, preferably circular cross-section. The shape of the hole can also be selected arbitrarily as needed and preferably corresponds to the shape of the spring element. Thus, for example, the hole can have an oval, preferably elliptical, preferably circular cross-section.

The spring element can press against the other clutch link using an arbitrary part as needed, however, a part of the external peripheral surface of the spring element is preferred as the contact area.

At least one further spring element can be situated in each hole as needed.

In addition, the hole can have at least one opening, whose edge protrudes at least partially radially inward. This edge is used to secure the spring element against slipping out of its hole. It is preferably implemented as a flanged edge.

The spring element can be fastened to the clutch link, preferably by spot welding, on at least one point, preferably in the area of the hole. This ensures the spring element is permanently secured on the clutch link and/or in the hole.

In addition, the invention provides for a method for producing a sintered component having connection apparatus, in particular a clutch link for a driving clutch, having the following steps:

forming a green body, which has a receptacle chamber for receiving another component, in particular another clutch link of the driving clutch, the receptacle chamber comprising a contact surface and a counter surface, which points toward the contact surface, and at least one hole being implemented behind the counter surface and being connected via a gap to the receptacle chamber;

sintering the green body; and inserting at least one spring element into each hole so that it has a contact area for contact on the other component and/or clutch link, which protrudes through the gap into the receptacle chamber.

Furthermore, the invention proposes a method for producing a sintered component having connection apparatus, in particular a clutch link for a driving clutch, having the following steps:

forming a green body, which has a projection for insertion into a receptacle chamber of another component, in particular another clutch link of the driving clutch, the projection comprising a contact surface and a counter surface, which points away from the contact surface, and at least one hole being implemented behind the counter surface and being connected via a gap to the external chamber located in front of the counter surface, i.e., to the receptacle chamber, if the projection is inserted into the receptacle chamber;

sintering the green body; and inserting at least one spring element into each hole so that it has a contact area for contact on the other component and/or clutch link, which protrudes through the gap into the external chamber located in front of the counter surface, i.e., into the receptacle chamber, if the projection is inserted into the receptacle chamber.

The invention also provides for a method for producing a sintered component having connection apparatus, in particular a clutch link for a driving clutch, having the following steps:

forming a green body, which is capable of engaging another component, in particular another clutch link of the driving clutch through interaction of a receptacle chamber and a projection, the link comprising a contact surface and a counter surface, with the contact surface and the counter surface located on tangential parallel planes, and at least one hole being implemented behind the counter surface and being connected via a gap to the receptacle chamber;

sintering the green body; and inserting at least one spring element into each hole so that it has a contact area for contact on the other component or clutch link, which protrudes through the gap into the receptacle chamber.

The green body may be provided such that it includes the receptacle chamber for receiving the other component, in particular the other clutch link of the driving clutch, and the counter surface points toward the contact surface.

Alternatively, the green body may be provided such that it includes the projection for insertion into the receptacle chamber of the other component, in particular the other clutch link of the driving clutch, and the counter surface points away from the contact surface.

In the proposed methods, the green body thus has the features of the corresponding proposed clutch link for a driving clutch, with the exception of the spring elements and the feature that the hole extends parallel to the longitudinal axis of the driving clutch. The spring elements are only inserted into the corresponding holes after the sintering of the green body. The green body can be formed in any arbitrary way as needed. The compression of powder is preferred, for example. In this case, it is particularly favorable to execute the holes as pocket holes, which are oriented parallel to the demolding direction of the compression mold. The spring elements may then be pushed easily into the pocket holes with the aid of automated assembly.

The present invention may further provide for:

implementing at least one further hole behind the contact surface and connecting the hole via a gap to the external chamber located in front of the contact surface, i.e., to the receptacle chamber, if the projection is inserted into the receptacle chamber; and inserting at least one further spring element into each further hole so that it has a contact area for contact on the other component and/or clutch link, which protrudes through the gap into the external chamber located in front of the contact surface, i.e., into the receptacle chamber, if the projection is inserted into the receptacle chamber.

Moreover, the invention provides for:

providing material excess, which projects axially, on at least a part of the peripheral edge of each hole during forming of the green body; and reshaping the material excess so that it projects at least partially radially inward after the spring element is inserted.

The part of the material excess which is reshaped radially inward results in a constriction of the hole outlet and ensures the spring elements are permanently secured in their holes.

Arbitrary methods may be selected as needed for the reshaping of the material excess, flanging or wobble riveting being preferred.

The spring element can be fastened, preferably by spot welding, to the component and/or clutch link on at least one point, preferably in the area of the hole. This ensures the spring element is permanently secured on the component and/or clutch link and/or in the hole.

Moreover, each hole can extend parallel to the longitudinal axis of the driving clutch. Easy demolding from a compression mold, which is preferably used during forming of the green body, is ensured by this orientation of the holes parallel to the longitudinal axis of the driving clutch.

Further advantageous embodiments of the invention will be explained in greater detail on the basis of the following drawings. The individual features originating therefrom are not restricted to the individual embodiments, rather, they may be combined with further individual features described above or features of other embodiments to form further embodiments.

DETAILED DESCRIPTION OF THE INVENTION

Figure 1:
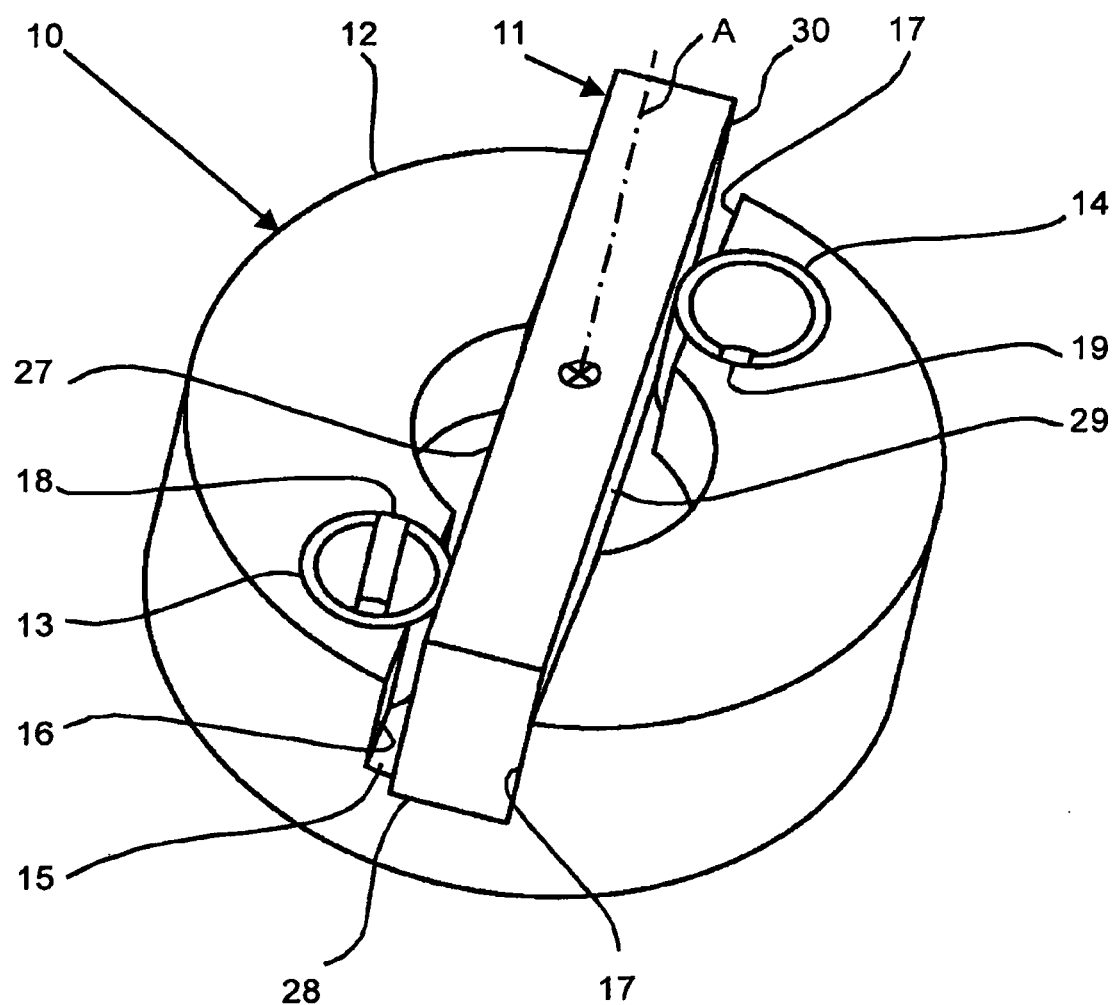
FIG. 1: shows a perspective illustration of a clutch link for a driving clutch in a first embodiment, which is connected to a second clutch link of the driving clutch.

The invention is described in greater detail hereafter on the example of a driving clutch, which is shown in various embodiments in FIGS. 1 through 9 and comprises a first and a second clutch link 10, 11. The first clutch link 10 is formed by a sintered component having connection apparatus in various embodiments, which is also referred to here as a first component 10, and the second clutch link 11 is formed by another, second component 11, and can also be a sintered component. The second component 11 is connected by the connection apparatus to the first component 10, so that the two clutch links 10, 11 are coupled.

Figure 2:
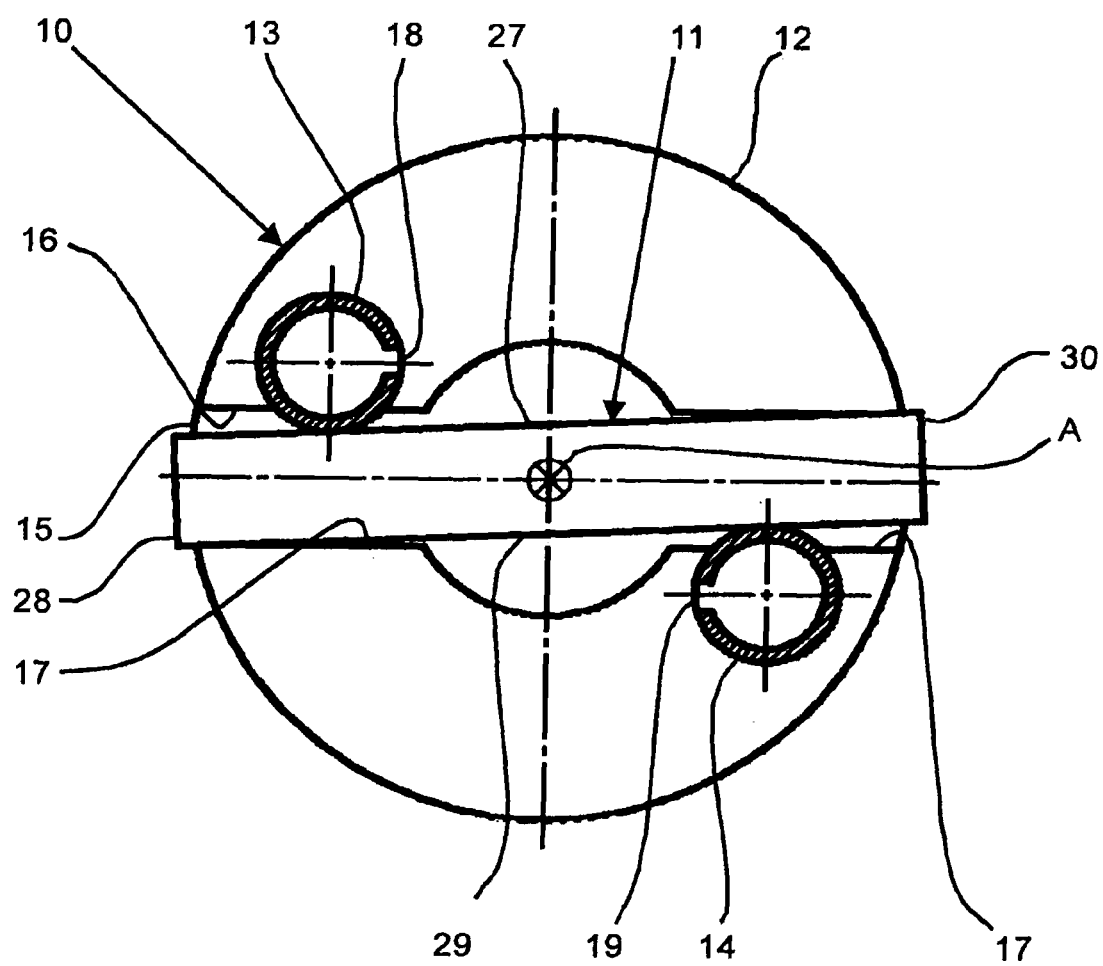
FIG. 2: shows a top view of FIG. 1.

FIGS. 1 and 2 show the first clutch link 10 in a first embodiment. It comprises a sintering material here and has a cylindrical main body 12 and a first and a second spring element 13, 14. The second clutch link 11 only has the form of a cuboid here to simplify the description. A receptacle chamber 15 in the form of a groove having a rectangular cross-sectional profile running along a diameter of the main body 12 is implemented in the top side of the main body 12. The receptacle chamber 15 has a first side wall, which is on the left in FIG. 1 and on top in FIG. 2, and which runs perpendicularly to the longitudinal axis A of the driving clutch, which runs from bottom to top and from back to front in FIGS. 1 and 2, respectively, and is also referred to as the counter surface 16 here, and a second side wall, which is on the right in FIG. 1 and on the bottom in FIG. 2, and which runs parallel to the first side wall and is also referred to as the contact surface 17 here. Counter surface 16 and contact surface 17 thus point toward one another and delimit the receptacle chamber 15. The width of the receptacle chamber 15 is greater than the width of the second clutch link 11, so that the second clutch link 11 is seated in the receptacle chamber 15 with play if the spring elements 13, 14 are not taken into consideration.

In addition, a first hole 18 and a second hole 19 in the form of pocket holes are implemented in the top side of the main body 12, which extend parallel to the longitudinal axis A of the driving clutch. The first hole 18 lies in the material of the main body 12 behind the counter surface 16 with radial spacing to the longitudinal axis A, and the second hole 19 lies diametrically opposite to the first hole 18 in the material of the main body 12 behind the contact surface 17. The diameter of the first hole 18 is greater than the spacing of the longitudinal axis A of the first hole 18 from the counter surface 16, so that the first hole 18 is connected via a gap in the counter surface 16 to the receptacle chamber 15. Similarly thereto, the diameter of the second hole 19 is greater than the spacing of the longitudinal axis A of the second hole 19 from the contact surface 17, so that the second hole 19 is connected via a gap in the contact surface 17 to the receptacle chamber 15. The depressions of the first clutch link 10, i.e., the receptacle chamber 15 and the holes 18, 19, do not form undercuts here.

The spring elements 13, 14 are each implemented as a hollow cylinder slotted in the longitudinal direction, the slot running parallel to the longitudinal axis of the hollow cylinder here and having a width which allows a desired spring travel of the spring element 13, 14 in the event of radial compression load. The external diameter of the relaxed spring elements 13, 14 essentially corresponds to the diameter of the particular holes 18, 19 and can be selected as smaller, equal to, or larger than this hole diameter as needed. However, it is to be greater than the sum of the hole radius and the spacing of the longitudinal axis of the corresponding hole 18, 19 from the counter surface 16 or contact surface 17, respectively, so that a part of the peripheral surface of the spring element 13, 14 protrudes through the gap into the receptacle chamber 15 even if the spring element 13, 14 presses against the rearmost part of the peripheral surface of the hole 18, 19, which is furthest away from the gap.

The first spring element 13 has a contact area lying in the receptacle chamber 15, which presses against a first support surface 27 of the second clutch link 11, which points toward the counter surface 16 and is on the left in FIG. 1 and on top in FIG. 2, and it presses the corresponding first end section 28 of the second clutch link 11, which is on the bottom in FIG. 1 and on the left in FIG. 2, elastically against the contact surface 17. Similarly thereto, the second spring element 14 has a contact area lying in the receptacle chamber 15, which presses against another, diametrically opposite second support surface 29 of the second clutch link 11, which points toward the contact surface 17 and is on the right in FIG. 1 and on the bottom in FIG. 2, and it presses the corresponding second end section 30 of the second clutch link 11, which is on top in FIG. 1 and on the right in FIG. 2, elastically against the counter surface 16. As a result, the play is compensated for by the spring elements 13, 14, which should actually be present because of the small width of the second clutch link 11 in comparison to the width of the receptacle chamber 15 and would also be present if spring elements 13, 14 were missing.

Figure 3:
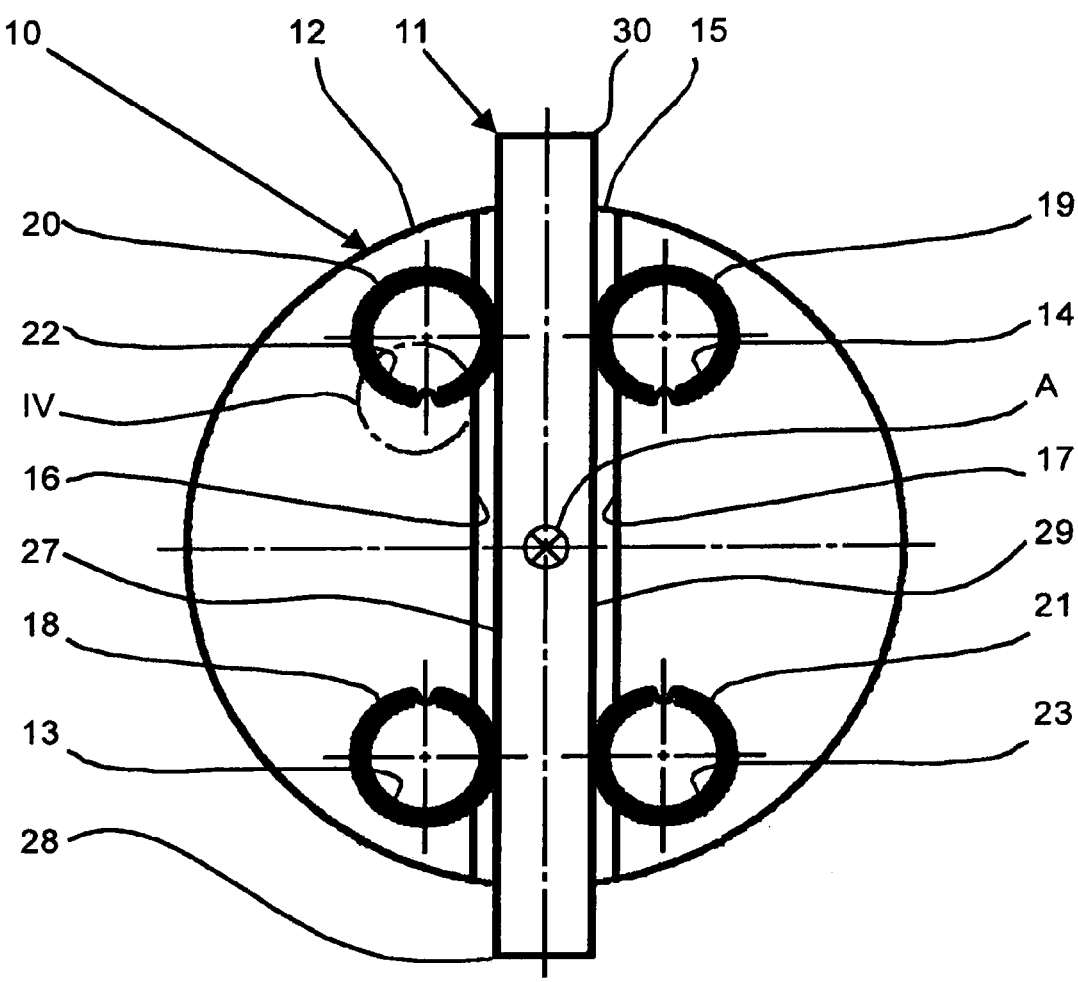
FIG. 3: shows a top view of a clutch link for a driving clutch in a second embodiment.
Figure 4:
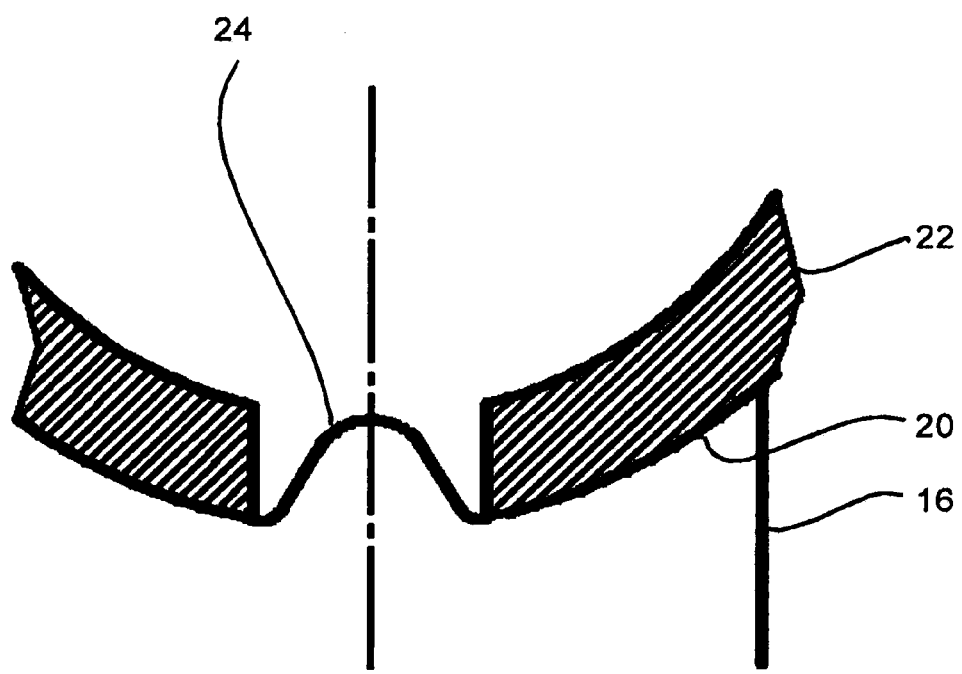
FIG. 4: shows detail IV from FIG. 3 in an enlarged scale.

FIGS. 3 and 4 show a clutch link 10 in a second embodiment, which is similar to the first embodiment, so that only the differences are described in greater detail hereafter. In this second embodiment, the first clutch link 10 has a further third hole 20, which is implemented behind the counter surface 16 and is connected via a gap to the receptacle chamber 15 like the first hole 18, but in contrast to the first hole 18, is opposite to the second hole 19, and a further fourth hole 21, which is implemented behind the contact surface 17 and is connected via a gap to the receptacle chamber 15 like the second hole 19, but in contrast to the second hole 19, is opposite to the first hole 18. Correspondingly, a further third spring element 22 and a further fourth spring element 23, which press against the first and the second support surfaces 27, 29 of the second clutch link 11, which are on the left and right, respectively, in FIG. 3, are situated in the third and fourth holes 20, 21. The second clutch link 11 is thus held in the first end section 28, which is on the bottom in FIG. 3, between the first and fourth spring elements 13, 23, and is held in the second end section 30, which is on top in FIG. 3, between the second and third spring elements 14, 22.

In addition, in the second embodiment, in each hole 18-21, a rib 24 runs parallel to the longitudinal axis of the hole 18-21 on the hole wall. FIG. 4 shows detail IV of FIG. 3 around the rib 24 of the third hole 20 in an enlarged scale. It can be seen well therein that the third spring element 22 is seated in the third hole 20 so that the rib 24 lies in its slot. Twisting of the third spring element 22 in the third hole 20 is thus prevented.

Figure 5:
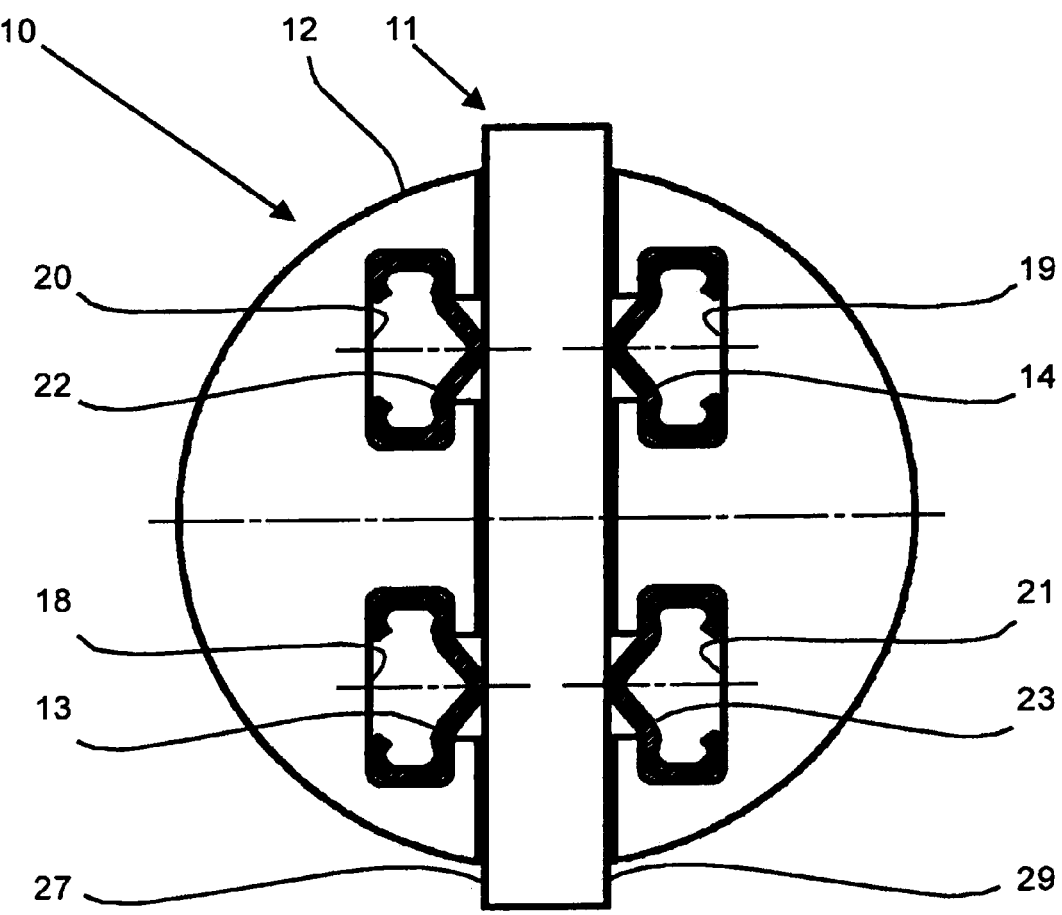
FIG. 5: shows a top view of a clutch link for a driving clutch in a third embodiment.

FIG. 5 shows a first clutch link 10 in a third embodiment, which is similar to the second embodiment, so that only the differences are described in greater detail hereafter. In this third embodiment, the four holes 18-21 have a rectangular cross-section, whose longer sides run parallel to the counter surface 16 and the contact surface 17. The four spring elements 13, 14, 22, 23 also have an essentially rectangular cross-section, their slots each lying in the longer side which faces away from the receptacle chamber 15, and the other longer side of the four spring elements 13, 14, 22, 23, which faces toward the receptacle chamber 15, each has a contact area arched outward in the form of a pitched roof, i.e., toward the receptacle chamber 15, which protrudes through the gap into the receptacle chamber 15 and whose ridge line presses against the support surfaces 27, 29 of the second clutch link 11. Because twisting of the spring elements 13, 14, 22, 23 in the holes 18-21 is not possible as a result of the shape of the holes 18-21 and the spring elements 13, 14, 22, 23, the ribs 24 of the second embodiment are dispensed with in this third embodiment.

Figure 6:
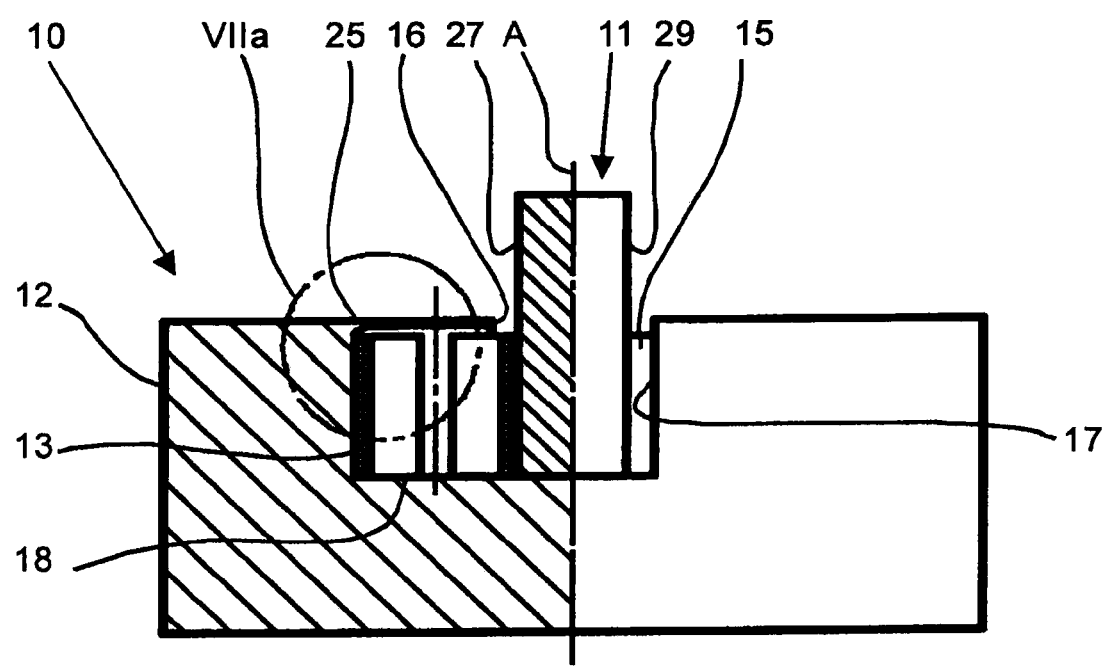
FIG. 6: shows a side view in partial section of a clutch link for a driving clutch in a fourth embodiment.
Figure 7A:
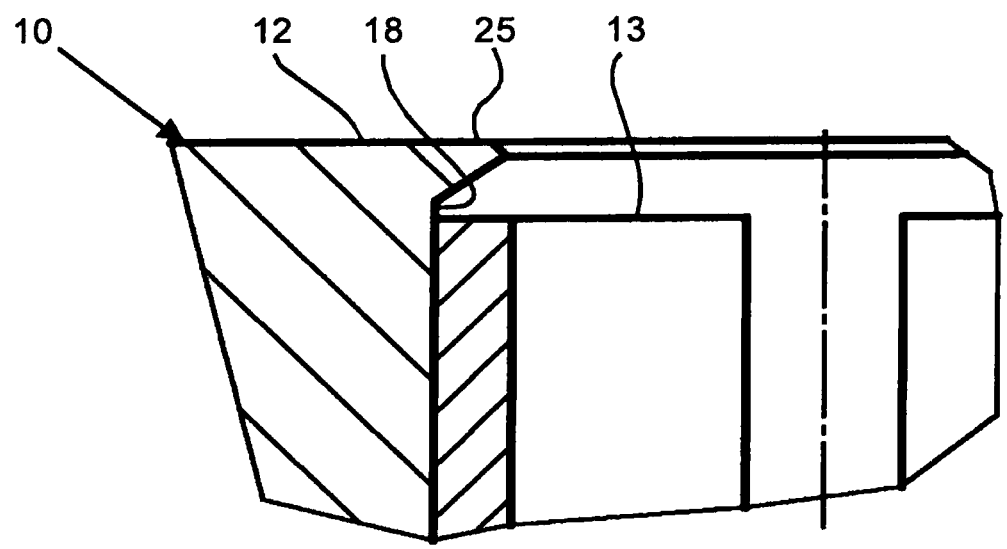
FIGS. 7a+b: show detail VIIa from FIG. 6 in a final state (FIG. 7a) and in a preliminary step (FIG. 7b) in an enlarged scale.
Figure 7B:
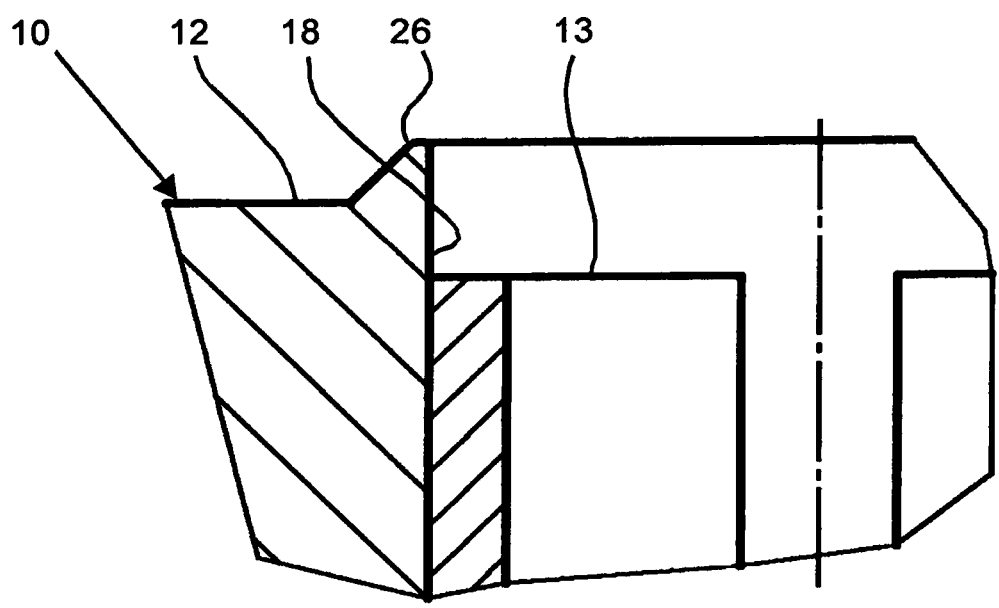

FIGS. 6, 7a, and 7b show a clutch link 10 in a fourth embodiment, which is similar to the first embodiment, so that only the differences are described in greater detail hereafter. FIG. 6 shows a section through the first clutch link 10 in the area of the first hole 18 in the left half, and FIG. 7a shows detail VIIa of FIG. 6 in an enlarged scale. In this fourth embodiment, the edge which delimits the opening of the first hole 18 is formed by a material excess 25 which projects radially inward. This prevents the first spring element 13, which is seated in the first hole 18 below the edge or material excess 25 and whose outer diameter is greater than the diameter of the opening, from being able to slip out through the opening from the first hole 18.

FIG. 7b shows a preliminary stage of the first clutch link 10, in which the opening is not yet constricted by the radially projecting edge or material excess 25 of FIG. 7a, but rather has the same diameter as the remaining peripheral surface of the first hole 18 adjoining on the bottom. Rather, in this preliminary stage, the opening is enclosed by an edge which is formed by an axially projecting material excess 26, so that the first spring element 13 can be pushed axially from above into the first hole 18. In a subsequent method step, this axially projecting edge or material excess 26 is folded over or reshaped radially inward, so that the edge or material excess 25 projecting radially inward results. This reshaping can preferably be performed by flanging or wobble riveting.

Figure 8:
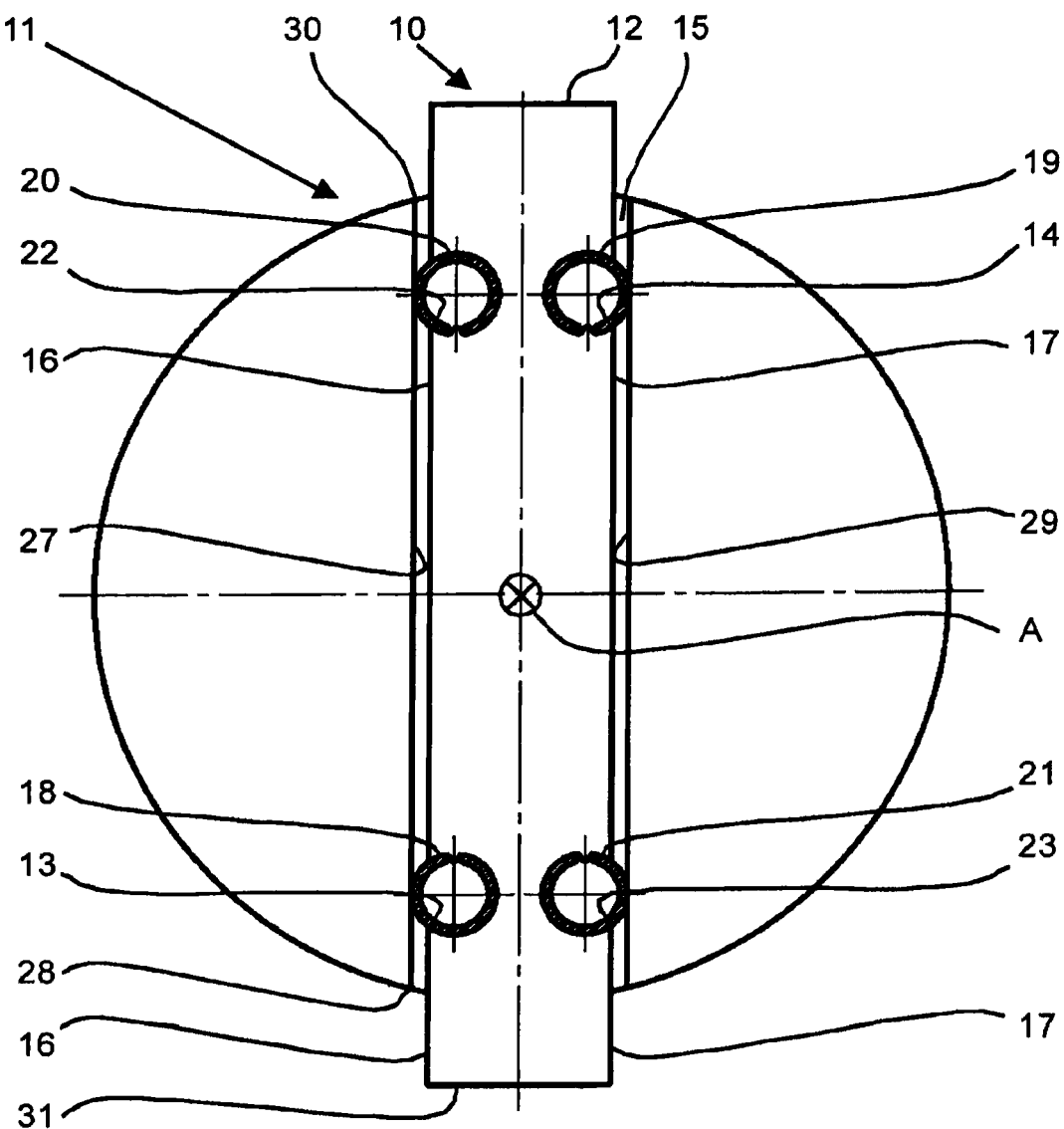
FIG. 8: shows a top view of a clutch link for a driving clutch in a fifth embodiment, which is connected to a second clutch link of the driving clutch.
Figure 9:
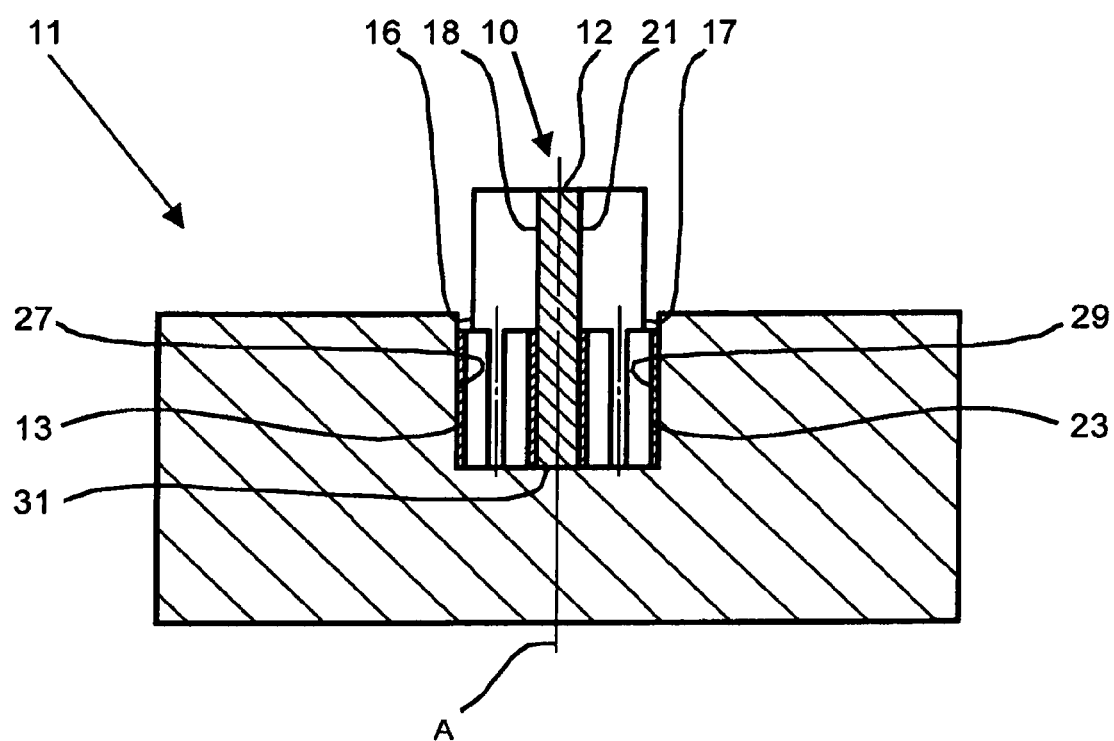
FIG. 9: shows a longitudinal section of FIG. 8.

FIGS. 8 and 9 show a clutch link 10 in a fifth embodiment, which is similar to the second embodiment, so that only the differences are described in greater detail hereafter. In this fifth embodiment, the first clutch link 10 essentially has the form of the second clutch link 11 of the second embodiment, i.e., the form of a cuboid, and the second clutch link 11 essentially has the form of the first clutch link 10 of the second embodiment, i.e., a cylindrical main body 12 having the receptacle chamber 15 in the form of a groove having rectangular cross-sectional profile. The first clutch link has a projection 31 for insertion into the receptacle chamber 15, which is formed here for simplification of the description by the lower section of the main body 12, on the bottom in FIG. 9, received in the receptacle chamber 15.

In this fifth embodiment, the projection 31 comprises the contact surface 17 and the counter surface 16, which are on the right and left, respectively, in FIGS. 8 and 9, and not the receptacle chamber 15 as in the second embodiment. Correspondingly, the first and second side walls of the receptacle chamber 15, which are on the left and right, respectively, in FIGS. 8 and 9, form the first and the second support surfaces 27, 29 of the second clutch link 11. The two support surfaces 27, 29 thus point toward one another and delimit the receptacle chamber 15, while in contrast counter surface 16 and contact surface 17 point away from one another and delimit the projection 31. The width of the receptacle chamber 15 is greater than the width of the projection 31, so that the projection is seated in the receptacle chamber 15 with play if the spring elements 13, 14 are not taken into consideration.

In this fifth embodiment, the four holes 18-21 in the top side of the main body 12 are not implemented in the form of pocket holes as in the second embodiment, but rather as through holes.

As in the second embodiment, the four holes 18-21 are implemented in the material of the main body 12, each with radial spacing to the longitudinal axis A of the driving clutch, which runs from back to front or from bottom to top in FIGS. 8 and 9, respectively, so that the first and the third holes 18, 20 behind the counter surface 16 are opposite to the fourth and the second holes 21, 19, respectively, and the second and the fourth holes 19, 21 behind the contact surface 17 are opposite to the third and the first holes 20, 18, respectively. The four spring elements 13, 14, 22, 23 are situated in the four holes 18-21 as in the second embodiment, have their contact areas protruding through their particular gap into the receptacle chamber 15, and have their contact areas pressing against the first and the second support surfaces 27, 29, respectively. The second clutch link 11 is thus held in the first end section 28, which is on the bottom in FIG. 8, by the first and fourth spring elements 13, 23, and is held in a second end section 30, which is on top in FIG. 8, by the second and third spring elements 14, 22.

Figure 10:
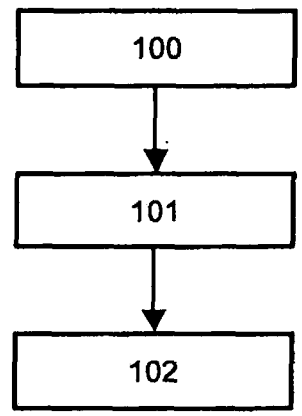
FIG. 10: shows a flowchart of a method for producing a sintered component having connection apparatus, in particular a clutch link for a driving clutch in a first embodiment.

FIG. 10 shows a flowchart of a method in a first embodiment for producing a sintered component having connection apparatus, in particular a clutch link for a driving clutch. For the exemplary explanation of this first embodiment, it is assumed that the sintered component or clutch link to be produced is the first clutch link 10 in the first embodiment. In this first embodiment of the method, in a step 100, a green body is formed, which corresponds to the main body 12 of the first clutch link 10. The green body thus has a receptacle chamber 15 for receiving another component—such as the second clutch link 11 in FIGS. 1 and 2—the receptacle chamber 15 comprising a contact surface 17 and a counter surface 16, which points toward the contact surface 17, and a first hole 18 being implemented behind the counter surface 16 and a second hole 19 being implemented behind the contact surface 17 and each being connected via a gap to the receptacle chamber 15. The forming of the green body can be performed by compression of the sintering material powder or by other suitable methods. In a following step 101, the green body is sintered. In a following step 102, a first spring element 13 and a second spring element 14 are inserted into the first and second holes 18, 19, respectively, so that each of the spring elements 13, 14 has a contact area for contact on the second clutch link 11, which protrudes through the gap of its particular hole 18, 19 into the receptacle chamber 15. The first clutch link 10 for a driving clutch, which comprises a sintering material, is thus produced.

Figure 11:
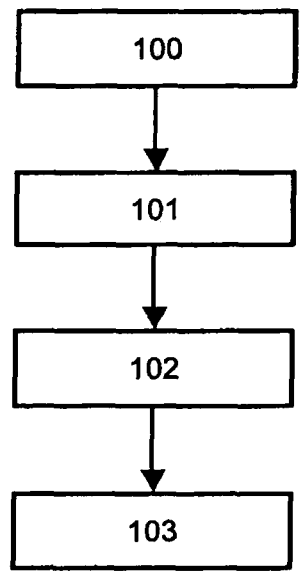
FIG. 11: shows a flowchart of a method for producing a sintered component having connection apparatus, in particular a clutch link for a driving clutch in a second embodiment.

FIG. 11 shows a flowchart of a method in a second embodiment for producing a sintered component having connection apparatus, in particular a clutch link for a driving clutch. This second embodiment is similar to the first embodiment of the method, so that only the differences are described in greater detail hereafter. For the exemplary explanation of this second embodiment of the method, it is assumed that the sintered component or clutch link to be produced is the first clutch link 10 in the fourth embodiment. In this second embodiment of the method, it is additionally provided in step 100 that upon forming of the green body, material excess 26, which projects axially, is provided on at least a part of the peripheral edge of the two holes 18, 19. In a step 103, which follows step 102, this axially projecting material excess 26 is reshaped so that an edge or material excess 25 projecting radially inward is formed. This reshaping of the axially projecting edge or material excess 26 can be performed by flanging or wobble riveting, for example.

I claim:

1. A first clutch link for a driving clutch, which is capable of engaging another clutch link of the driving clutch through interaction of a receptacle chamber and a projection, the projection being of a length substantially equal to or greater than a length of the receptacle chamber, wherein:
the first clutch link comprises a contact surface and a counter surface, with the contact surface and the counter surface located on parallel planes;
a hole is implemented behind the counter surface and is connected via a gap to the receptacle chamber, the counter surface extending away from each side of the gap in a direction parallel to the contact surface;
the hole extends parallel to the longitudinal axis of the driving clutch; and
a spring element is situated in the hole and has a contact area for contact on the other clutch link, which protrudes through the gap into the receptacle chamber;

wherein the hole has at least one opening, whose edge projects at least partially radially inward with respect to the hole in order to prevent the spring element from slipping through the opening of the hole in the axial direction.

2. A first clutch link for a driving clutch according to claim 1, wherein the first clutch link includes the receptacle chamber for receiving the other clutch link of the driving clutch and the receptacle chamber comprises the contact surface and the counter surface, which points toward the contact surface.

3. A first clutch link for a driving clutch according to claim 2, wherein the receptacle chamber is a groove having has non-tapered side walls.

4. A first clutch link for a driving clutch according to claim 1, wherein the first clutch link includes the projection for insertion into the receptacle chamber of the other clutch link of the driving clutch, the projection comprising the contact surface and the counter surface, which points away from the contact surface.

5. A first clutch link according to claim 1, wherein the first clutch link comprises a sintering material.

6. A first clutch link according to claim 1, wherein:
at least one further hole is implemented behind the counter surface and is connected via a gap to the receptacle chamber;
each further hole extends parallel to the longitudinal axis of the driving clutch; and
at least one further spring element is situated in each further hole, has a contact area for contact on the other clutch link, and protrudes through the gap into the receptacle chamber.

7. A first clutch link according to claim 1, wherein:
at least one further hole is implemented behind the contact surface and is connected via a gap to the receptacle chamber;
each further hole extends parallel to the longitudinal axis of the driving clutch; and
at least one further spring element is situated in each further hole, has a contact area for contact on the other clutch link, and protrudes through the gap into the receptacle chamber.

8. A first clutch link according to claim 1, wherein the spring element comprises a hollow cylinder, which has a slot running between two front faces.

9. A first clutch link according to claim 1, wherein the spring element comprises a ring, which has a slot.

10. A first clutch link according to claim 1, wherein a protrusion projects from the peripheral surface of the hole and lies in a slot in the spring element.

11. A first clutch link according to claim 1, wherein the spring element comprises a pin or bolt made of plastic and/or rubber.

12. A first clutch link according to claim 1, wherein the spring element has a peripheral surface having a cross-section having the shape selected from the group consisting of oval, elliptical, and circular.

13. A first clutch link according to claim 1, wherein the hole has a cross-section having the shape selected from the group consisting of oval, elliptical, and circular.

14. A first clutch link according to claim 1, wherein the contact area is part of the outer peripheral surface of the spring element.

15. A first clutch link according to claim 1, wherein the edge is implemented as a flanged edge, the flanged edge preventing the spring element situated in the hole from slipping out of the hole.

16. A first clutch link according to claim 1, wherein the spring element is fastened to the first clutch link on at least one point.

17. A driving clutch, comprising:
a first clutch link;
a second clutch link;
wherein:
the first clutch link is capable of engaging the second clutch link of the driving clutch through interaction of a receptacle chamber and a projection;
the first clutch link comprises a contact surface and a counter surface, with the contact surface and the counter surface located on parallel planes;
a hole is implemented behind the counter surface and is connected via a gap to the receptacle chamber, the counter surface extending away from each side of the gap in a direction parallel to the contact surface;
the hole extends parallel to the longitudinal axis of the driving clutch;
a spring element is situated in the hole and has a contact area for contact on the second clutch link, which protrudes through the gap into the receptacle chamber;
wherein the hole has at least one opening, whose edge projects at least partially radially inward with respect to the hole in order to prevent the spring element from slipping through the opening of the hole in the axial direction.

* * * * *